(12) United States Patent
Rosonina et al.

(10) Patent No.: US 12,197,595 B2
(45) Date of Patent: Jan. 14, 2025

(54) BATCH PROCESSING OF KEY GENERATION REQUESTS

(71) Applicant: nTropy.io, Inc., Cocoa Beach, FL (US)

(72) Inventors: Steven Rosonina, Scottsdale, AZ (US); Charles Grochowski, Cocoa Beach, FL (US)

(73) Assignee: nTropy.io, Inc., Cocoa Beach, FL (US)

( * ) Notice: Subject to any disclaimer, the term of this patent is extended or adjusted under 35 U.S.C. 154(b) by 213 days.

(21) Appl. No.: 18/153,758

(22) Filed: Jan. 12, 2023

(65) Prior Publication Data

US 2024/0241968 A1    Jul. 18, 2024

(51) Int. Cl.
*G06F 21/60* (2013.01)
*G06F 21/44* (2013.01)

(52) U.S. Cl.
CPC ............ *G06F 21/602* (2013.01); *G06F 21/44* (2013.01)

(58) Field of Classification Search
CPC ............................... G06F 21/602; G06F 21/44
See application file for complete search history.

(56) References Cited

U.S. PATENT DOCUMENTS

| | | | | |
|---|---|---|---|---|
| 10,447,683 | B1* | 10/2019 | Loladia | H04W 12/71 |
| 10,673,617 | B1* | 6/2020 | Antoniou | G06F 13/4282 |
| 11,265,709 | B2* | 3/2022 | Murray | G06F 21/602 |
| 2018/0013561 | A1* | 1/2018 | Gersten | H04L 9/16 |
| 2018/0183587 | A1* | 6/2018 | Won | H04L 63/166 |
| 2020/0162503 | A1* | 5/2020 | Shurtleff | G06F 9/451 |
| 2022/0086252 | A1* | 3/2022 | Chen | H04W 4/70 |
| 2022/0303179 | A1* | 9/2022 | Rodriguez Bravo | H04L 12/2809 |
| 2022/0400379 | A1* | 12/2022 | Lanov | H04W 12/08 |
| 2022/0407786 | A1* | 12/2022 | Jimenez | H04L 67/34 |
| 2023/0131803 | A1* | 4/2023 | Camenzind | H04L 63/0823 726/26 |
| 2023/0214201 | A1* | 7/2023 | Liu | G06F 8/61 709/201 |
| 2024/0243904 | A1 | 7/2024 | Rosonina et al. | |
| 2024/0243912 | A1 | 7/2024 | Rosonina et al. | |
| 2024/0243930 | A1* | 7/2024 | Walther | H04L 9/3073 |

FOREIGN PATENT DOCUMENTS

CN          110113164 A  *  8/2019  .......... H04L 63/062

* cited by examiner

*Primary Examiner* — Richard G Keehn
(74) *Attorney, Agent, or Firm* — Lee & Hayes, P.C.

(57) ABSTRACT

Systems and methods are disclosed for batch processing of key generation requests for internet-of-things (IoT) device vendors. An example method may include maintaining a queue of internet of things (IoT) devices for which encryption material generation has been requested. The method may also include receiving, from a first vendor, a first order to generate first encryption material for a first set of IoT devices and receiving, from a second vendor, a second order to generate second encryption material for a second set of IoT devices. The method may further include generating a dynamic encryption material schedule configured to partition the first set of IoT devices and partition the second set of IoT devices and applying the dynamic encryption material schedule such that the first encryption material and the second encryption material are generated at least partially in parallel.

20 Claims, 8 Drawing Sheets

BATCH PROCESSING OF KEY GENERATION REQUESTS

BACKGROUND

Internet of things (IoT) device vendors often generate and manage their own encryption key material. However, generating and managing large-scale quantities (millions) of encryption key material can be a burdensome task for vendors, especially in environments where encryption key material may be compromised and reused when producing counterfeit IoT devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
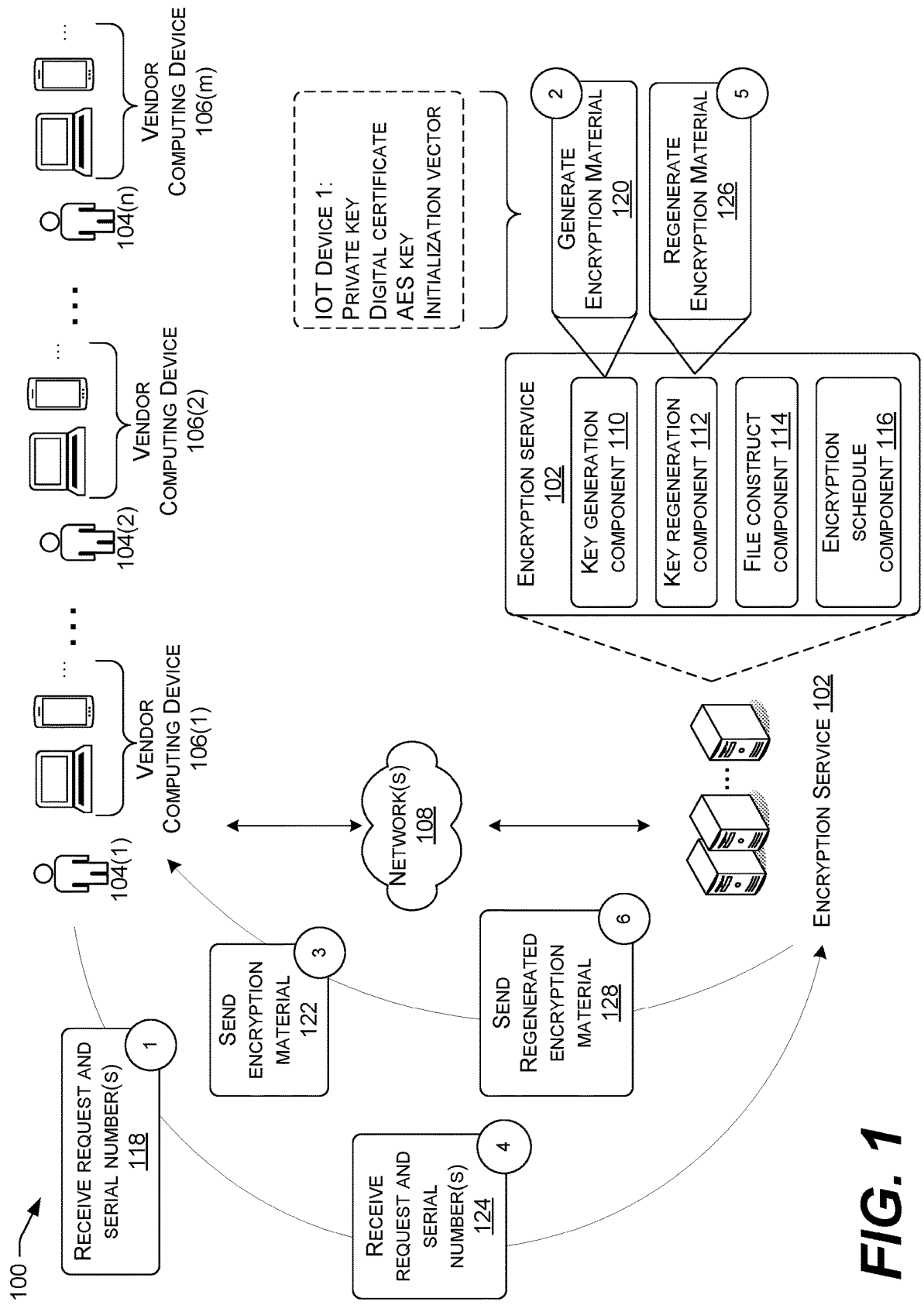
FIG. 1 is a schematic view of an example system usable to generate and regenerate encryption material, according to an embodiment as described herein.

As discussed above, the outsourcing of production services has made IoT device manufacturing more accessible to vendors. However, the convenience of contract manufacturing has also increased the risk of counterfeiting, including cloning (contract manufacturers reproducing IoT products illegitimately using the same encryption material) and overproducing (contract manufacturers can over produce IoT devices beyond an agreed quota). Counterfeit IoT devices manufactured using compromised encryption material may make it extremely difficult for consumers to tell the difference between genuine IoT devices and counterfeits.

This application describes techniques for generating encryption material on a large-scale (millions) for IoT devices across multiple IoT vendors and management of that key encryption material between IoT hub devices and IoT devices that exist in the same ecosystem. This application describes techniques for single-use validation services in order to prevent key encryption material from being utilized multiple times. This application further describes techniques for generating dynamic encryption material schedule(s) that are configured to balance the generation of encryption material between two or more orders. This application also describes generating a file construct specific to the generated key encryption materials in order to increase security. Various examples of the present disclosure include systems, methods, and non-transitory computer-readable media of an encryption service.

This disclosure describes, at least in part, a method for generating encryption material. The method may include receiving, via a cloud-based server, a request for encryption materials for a set of internet-of-things (IoT) devices and, for individual ones of the IoT devices in the set of IoT devices, a serial number associated with a IoT device from a vendor. The method may also include generating, for the IoT device, a private key and a digital certificate. Also, the method may include combining the private key and the digital certificate with a server-side Elliptic Curve Cryptography (ECC) public key such that random bits are derived. The method may further include generating first data representing a hash of the random bits and generating two sets of the first data representing the hash, wherein the first set represents an advanced encryption standard (AES) key and a second set represents an initialization vector (IV). The AES key and IV may be configured to encrypt analytical information generated by the IoT device. The method may also include sending, in response to receiving the request and to a computing system associated with the vendor, the encryption material include the two sets of the first data in a format configured to be utilized by the computing system of the vendor to store the encryption material in a storage of the set of IoT devices. The method may further include programing the IoT device to include the serial number, the private key, the digital certificate, the AES key, and the IV in a format configured to enable the cloud-based server to authenticate the IoT device as being a part of an authorized ecosystem associated with the IoT device and to enable encryption of collected data from the IoT device.

In some examples, the method may further include programing the IoT device to include the serial number, the private key, the digital certificate, the AES key, and the IV in a format configured to enable the cloud-based server to authenticate the IoT device as being a part of an authorized ecosystem associated with the IoT device and to enable encryption of collected data from the IoT device.

In some examples, wherein the vendor comprises a first vendor, the method further includes receiving, via the cloud-based server, a first batch of serial numbers, each associated with IoT devices from the first vendor. The method may further include receiving, via the cloud-based server, a second batch of serial numbers, each associated with IoT devices from a second vendor. The method may also include generating, via the cloud-based server, key encryption material associated with the first batch of IoT devices from the first vendor and the second batch of IoT devices from the second vendor.

In some examples, the method further includes receiving, from the vendor, a request to decrypt the analytical information and the serial number associated with the IoT device. The method may further include regenerating, based at least in part on the IoT device's serial number, the AES key and the IV and sending, to the vendor, the AES key and the IV in a format configured to be utilized by the vendor to decrypt the analytical information.

In some examples, wherein the request for encryption material is a first request and the set of IoT devices is a first set of IoT devices, the method may further include receiving, via the cloud-based server, a second request for encryption materials for a second set of IoT devices configured to connect to and be identified by the first set of IoT devices and generating encryption material for the second set of IoT devices for the vendor. For example, the first set of IoT devices may be considered "hub" devices and the second set of IoT devices are interdependent such that they are can be authenticated and authorized to connect to and communicate with the hub devices.

In some examples, wherein the random bits comprise first random bits, the method may further include receiving, from the vendor, a request to decrypt analytical information associated with the IoT device and the serial number. The method may further include extracting, based at least in part on the serial number, a public key associated with the IoT device and combining the public key with a server-side ECC private key to derive second random bits. The example method may further include generating second data representing an additional hash of the second random bits and generating key material containing a second AES key and a second IV. The method may further include sending, to the computing system associated with the vendor, the key material in a format configured to enable the vendor to decrypt the analytical information.

This application further describes techniques for generating dynamic encryption material schedule(s) that are configured to balance the generation of encryption material between two or more orders. For example, the method may include maintaining first data representing a queue of IoT devices for which encryption material generation has been requested and receiving, from a first computing system associated with a first vendor, a first order to generate first encryption material for a first set of IoT devices. The method may further include generating second data representing a first updated queue that includes the first set of IoT devices with previously pending IoT devices. The method may further include receiving, from a second computing system associated with a second vendor, a second order to generate second encryption material for a second set of IoT devices. The method may also include generating third data representing a second updated queue that includes the second set of IoT devices with the first set of IoT devices and the previously pending IoT devices. The method may further include generating fourth data representing a dynamic encryption material schedule configured to partition the first set of IoT devices into a first number of portions, partition the second set of IoT devices into a second number of portions, and cause the first number of portions of the first set of IoT devices to be interweaved with the second number of portions of the second set of IoT devices such that at least a portion of the second encryption material is generated for at least a portion of the second set of IoT devices prior to complete generation of the first encryption material for all of the first set of IoT devices. The method may further include applying the dynamic encryption material schedule such that the first encryption material and the second encryption material are generated at least partially in parallel.

In some examples, the method may further include determining, based at least in part on an identifier associated with the first vendor, that a first priority level associated with the first order is a higher priority level than a second priority level associated with the second order and wherein generating the fourth data representing the dynamic encryption material schedule is based at least in part on the first priority level being the higher priority level than the second priority level.

In some examples, the method may further include receiving, from a third computing system associated with a third vendor, a third order to generate third encryption material for a third set of IoT devices generating fifth data representing a third updated queue that includes the third set of IoT devices with the previously-pending IoT devices. The method may further include generating sixth data representing the dynamic encryption material schedule configured to partition the third set of IoT devices into a third number of portions and cause the third number of portions of the third set of IoT devices to be interweaved with the first number of portions of the first set of IoT devices and the second number of portions of the second set of IoT devices such that at least a portion of the third encryption material is generated for at least a portion of the third set of IoT devices prior to complete generation of the first encryption material for all of the first set of IoT devices and the second encryption material for all of the second set of IoT devices. The method may further include applying the dynamic encryption material schedule such that the first encryption material, the second encryption material, and the third encryption material are generated at least partially in parallel.

In some examples, the method may further include storing a trained machine learning model configured to determine dynamic encryption material schedules for generation of encryption material across multiple vendors. The method may further include collecting vendor data and order data associated with the first vendor and the second vendor and applying the trained machine learning model to the vendor data and order data such that the dynamic encryption material schedule is generated and is specific to the first vendor and the second vendor.

In some examples, the method may further include determining a completion time associated with completing the first order and the second order and determining that the completion time associated with the first order is earlier than the completion time of the second order, wherein generating the second data representing the dynamic encryption material schedule is based at least in part on the completion time associated with the first order being earlier than the completion time of the second order.

In some examples, the method may include determining a number of orders in the queue, wherein generating the second data representing the dynamic encryption material schedule is based at least in part on the number of orders in the queue.

This application also describes generating a file construct specific to the generated key encryption materials in order to increase security of the generated encryption material. For example, the method may include receiving, from a computing system associated with a vendor, an order to generate encryption material for a set of internet of things (IoT) devices and generating first data representing a file construct, the file construct containing second data representing encryption material for each of the IoT devices, the encryption material including (1) a private key, (2) a digital certificate, (3) an advanced encryption standard (AES) key, and (4) an initialization vector (IV). In some examples, the encryption material may further include a manufacture identifier configured to identify one or more vendor approved manufacturing facilities at which the IoT devices may be processed. In some examples, the order to generate encryption material for multiple IoT devices is divided into multiple portions such that each portion is associated with unique symmetric key material. The method may further include generating third data representing asymmetric key material, the asymmetric key material including both a public key configured to encrypt the file construct and a private key configured to decrypt the file construct. The method may include encrypting the file construct by utilizing the public key and receiving, from a computing device associated with a manufacturing facility, a request to access the file construct. The method may also include determining that the manufacturing facility is authorized to access the file construct and sending the file construct and private key to the computing device associated with the manufacturing facility, the private key enabling the manufacturing facility to decrypt the file construct and access the encryption material for each of the IoT devices. In some examples, determining that the manufacturing facility is authorized to access the file construct is further based at least in part on a number of requested key material matching the number of authorized encryption material.

In some examples, the method may further include determining an IoT device type(s) indicated in the order to generate encryption material. The method may also include determining that the manufacturing facility is authorized to access the file construct based at least in part on the IoT device type corresponding to an authorized IoT type indicator associated with the manufacturing facility.

In some examples, wherein the file construct is a first file construct, the asymmetric key material is first asymmetric key material, the method may further include determining that the manufacturing facility is no longer authorized to access the first file construct and pausing generation of remaining encryption material for the set of IoT devices. The method may also include generating fourth data representing a second file construct, generating fifth data representing second asymmetric key material, and encrypting the second file construct by utilizing the second asymmetric key material.

In some examples, the method may further include determining a risk level associated with the manufacturing facility and generating new data representing asymmetric key material configured to encrypt newly generated file constructs at a higher or lower frequency based at least in part on the risk level. In some examples, the maximum number of unique encryption material contained in the file construct is based at least in part on the risk level associated with the manufacturing facility intended to receive the file construct.

In some examples, wherein the asymmetric key is a first asymmetric key, the method may further include generating, based at least in part on an expiration time associated with the first asymmetric key, fourth data representing a second asymmetric key.

These and other aspects are described further below with reference to the accompanying drawings. The drawings are merely example implementations and should not be construed to limit the scope of the claims. For example, while examples are illustrated in the context of a user interface for a mobile device, the techniques may be implemented using any computing device and the user interface may be adapted to the size, shape, and configuration of the particular computing device.

Example System Architecture

FIG. 1 is a schematic view of an example system 100 usable to generate and regenerate encryption material, according to an embodiment as described herein. The system 100 of FIG. 1 may include users 104(1), 104(2), . . . 104(*n*) (collectively "users 104") associated with vendor computing devices 106(1), 106(2), . . . 106(*m*) (collectively "vendor computing devices"), and an encryption service 102, which can communicate via network(s) 108. In this example, n and m are non-zero integers greater than 1. A user 104(1) may be described as a vendor or a merchant. Each of the devices can comprise one or more computing devices.

Each of the vendor computing devices 106 includes one or more processors and memory storing computer executable instructions to implement the functionality discussed herein attributable to the various computing devices. In some examples, the vendor computing devices 106 may include desktop computers, laptop computers, tablet computers, mobile devices (e.g., smart phones or other cellular or mobile phones, mobile gaming devices, portable media devices, etc.), or other suitable computing devices. The vendor computing devices 106 may execute one or more client applications, such as a web browser (e.g., Microsoft Windows Internet Explorer, Mozilla Firefox, Apple Safari, Google Chrome, opera, etc.) and/or a native or special-purpose client application (e.g., social media applications, messaging applications, email applications, games, etc.), to access and view content over the network(s) 108.

The network(s) 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the vendor computing devices 106 may access the encryption service 102 and/or communicate with one another.

The encryption service 102 may include one or more components such a key generation component 110, a key regeneration component 112, a file construct component 114, and an encryption schedule component 116.

The encryption service 102 may include one or more servers or other computing devices, any or all of which may include one or more processors and memory storing computer executable instructions to implement the functionality discussed herein attributable to the encryption service 102 or digital platform. The encryption service 102 may enable users 104(1) (such as persons, organizations, vendors, merchants, manufacturing facilities) to interact with the encryption service 102 and, in some cases, with each other via the vendor computing devices 106. The encryption service 102 may, with input from a user 104(1), create and store in the encryption service 102 a user account associated with the user. In some examples, the encryption service 102 may receive and send data or other information via a cloud-based server.

The encryption service 102 may be configured to receive information from a vendor computing device 106(1) via a cloud-based server. For example, at operation 118 (indicated by "1"), the encryption service 102 may receive a request (i.e., an order) to generate encryption material for a set of IoT devices from a user 104(1) associated with a vendor computing device 106(1). The request to generate encryption material may also include a serial number to be associated with each of the IoT devices in the set of IoT devices. In some examples, the key generation component 110 of the encryption service 102 may receive the request to generate encryption material. In some examples, the encryption service 102 may be configured to receive a first batch of serial numbers, each associated with IoT devices from a first vendor and a second batch of serial numbers, each associated with IoT devices from a second vendor.

At operation 120 (indicated by "2"), the key generation component 110 may generate encryption material for each of the IoT devices in the set of IoT devices. For example, the key generation component 110 may generate, for each of the IoT devices, an asymmetric key pair (i.e., a private key and a public key) and a digital certificate. The private key may be a random integer in a certain range. For example, the private key may be a random 256-bit integer. In some examples, an IoT device's public key may be extracted from the IoT device's digital certificate. The private key and digital certificate may be used to authenticate an IoT device as being part of an authorized ecosystem. An authorized ecosystem is a broad network of connected and interdependent devices that may be used for a specific goal. For example, an IoT hub device (a managed service hosted in the cloud that acts as a central message hub for communication between an IoT application and its attached IoT devices) may be a Phillips Hue Bridge device and can connect to and control Hue Lightbulbs (i.e., a second set of IoT devices) from a smart device via the Phillips Hue Application.

Furthermore, the key generation component 110 may combine the IoT device's private key and the digital certificate with a server-side Elliptic Curve Cryptography (ECC) public key such that random bits are derived. For example, an IoT device's private key may be combined with a server-side ECC public key using an Elliptic Curve Diffie-Hellman (ECDH) key exchange function to derive 256 random bits. Different elliptic curves may provide a different level of security (i.e., cryptographic strength), a different level of performance (i.e., speed), different key length, and may also involve different algorithms. In some examples, the length of the ECC public key may depend on an underlying elliptic curve. For example, the ECC public key may be 192-bit (curve secp192r1), 233-bit (curve sect233k1), 224-bit (curve secp224k1), 256-bit (curves secp256k1 and Curve25519), 283-bit (curve sect283k1), 384-bit (curves p384 and secp384r1), 409-bit (curve sect409r1), 414-bit (curve Curve41417), 448-bit (curve Curve448-Goldilocks), 511-bit (curve M-511), 521-bit (curve P-521), 571-bit (curve sect571k1), and the like.

In some instances, when the key generation component 110 derives 256 random bits, the key generation component 110 may process the 256 random bits via a hashing function in order to further randomize the 256 random bits. For example, the key generation component 110 may perform a Secure Hash Algorithm (SHA) 256 hashing function. In some examples, the key generation component 110 may divide the 256 random bits into two sets of data representing an IoT device's symmetrical key material where the first set represents an IoT device's advanced encryption standard (AES) key and the second set represents the IoT device's initialization vector (IV). In some examples, bits 0-127 represent the IoT device's AES key and bits 128-256 represent the IoT device's IV. The AES key and IV are configured to encrypt private analytical information generated and stored by the IoT device while performing in an authorized ecosystem.

At operation 122 (indicated by "3"), the encryption service 102 may send, in response to receiving the request from a vendor computing device 106(1), the encryption material including the AES key and the IV in a format configured to be utilized by the computing system of the vendor to store the encryption material in a storage of the IoT devices. The encryption material may be in a format configured to enable a user of the IoT device to authenticate the IoT device as being part of an authorized ecosystem.

In some examples, the encryption service 102 may program the IoT device to include the serial number, the private key, the digital certificate, the AES key, and the IV in a format configured to enable a cloud-based server to authenticate the IoT device as being a part of an authorized ecosystem associated with the IoT device and to enable encryption of the collected data from the IoT device. The IoT device may be configured to encrypt analytical information generated, collected, and/or stored by the IoT device by utilizing the encryption material generated by the encryption service 102. For example, the IoT device may be configured to encrypt analytical information by utilizing the AES key and the IV.

In some examples, the IoT device may transmit, via a cloud-based server or network(s) 108, the IoT device's encrypted analytical information to a user's centralized service for processing. The IoT device may also send the IoT device's digital certificate and/or the IoT device's serial number along with the encrypted analytical information. The user's centralized service may then send the IoT device's digital certificate and/or the IoT device's serial number to the encryption service 102 for key regeneration.

At operation 124 (indicated by "4"), the encryption service 102 may receive, from a user 104(1) associated with a vendor computing device 106(1), a request to decrypt analytical information associated with an IoT device. The request may include a serial number associated with the IoT device. In some examples, the encryption service 102 may receive the request to decrypt analytical information from an individual IoT device, a user's centralized service, a vendor computing device 106(1), or from a server associated with the vendor computing device 106(1). The request to decrypt analytical information may be associated with a key regeneration process.

At operation 126 (indicated by "5"), the key regeneration component 112 may extract the IoT device's public key by using the IoT's digital certificate. In some examples, the encryption service 102 may use the IoT device's serial number to obtain or look up the IoT device's digital certificate. During key regeneration, the key regeneration component 112 may combine the IoT device's public key with a server-side ECC private key using an ECDH function to derive random bits. In some examples, the key regeneration component 112 may process the random bits via a hashing function in order to further randomize the random bits. For example, the key regeneration component 112 may perform a SHA 256 hashing function in order to generate 256 random bits. The key regeneration component 112 may further break up or divide the random bits to generate the IoT device's symmetrical key material. For example, the key regeneration component 112 may divide 256 random bits into two sets of data where the first set includes bits 0-127 and represents an IoT device's advanced encryption standard (AES) key and the second set includes bits 128-256 and represents the IoT device's initialization vector (IV).

At operation 128 (indicated by "6"), the encryption service 102 may send the regenerated encryption material including the AES key and the IV to a user 104(1) associated with a vendor computing device 106(1). For example, the encryption service 102 may generate and encrypt a file construct containing the regenerated encryption material and send, via a network, the file construct to the vendor computing device 106(1).

Figure 2:
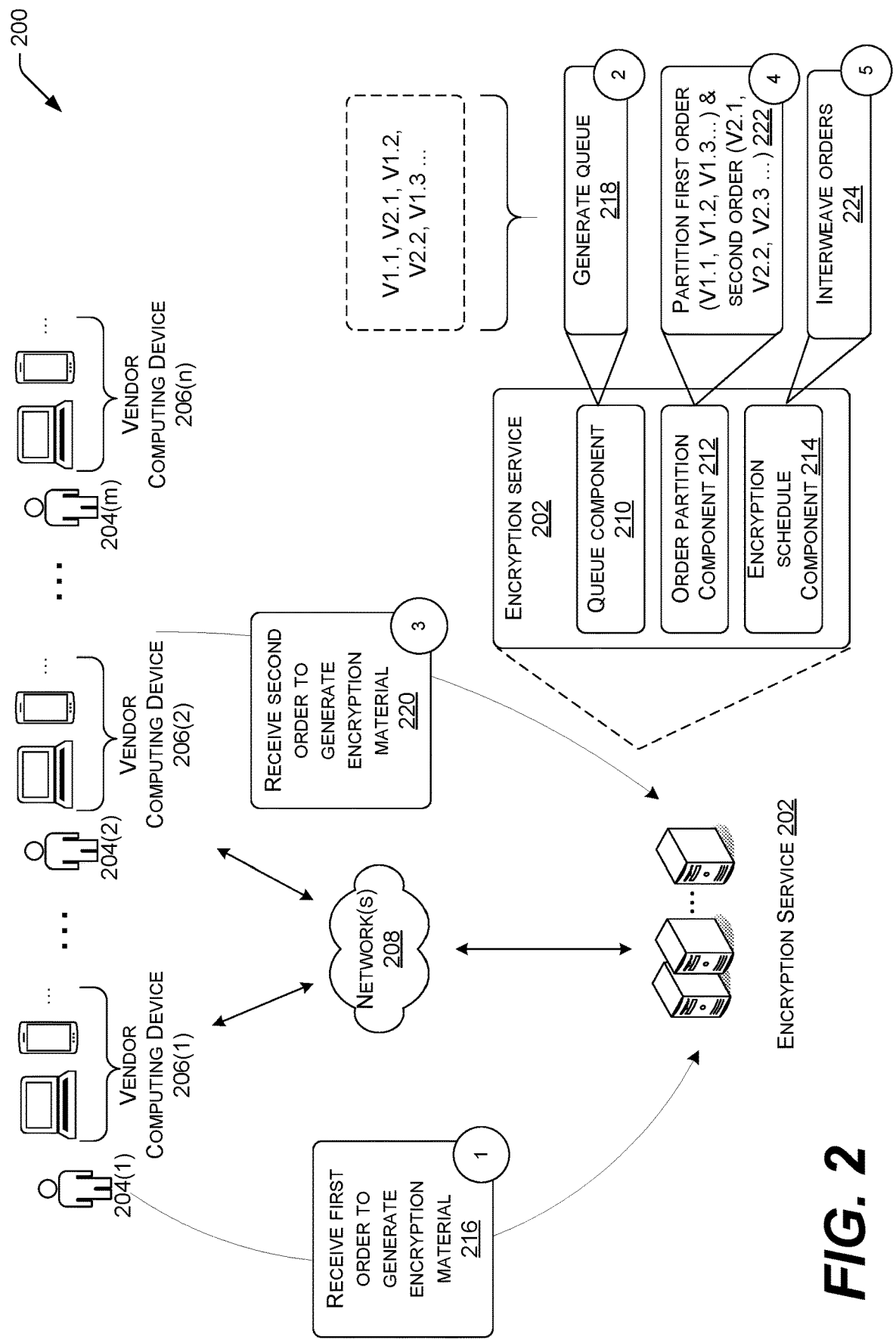
FIG. 2 is an example environment for generation of encryption material for a first vendor and a second vendor, according to an embodiment as described herein.

FIG. 2 is a schematic view of an example environment 200 for generation of encryption material for a first vendor and a second vendor, according to an embodiment as described herein. The example environment 200 of FIG. 2 may include users 204(1), 204(2), . . . 204(n) (collectively "users 204") associated with vendor computing devices 206(1), 206(2), . . . 206(m) (collectively "vendor computing devices"), and an encryption service 202, which can communicate via network(s) 208. Additionally, the vendor computing devices 206 and the encryption service 202 may include the same or similar components as described with respect to FIG. 1. The encryption service 202 may also include a queue component 210, an order partition component 212, and an encryption schedule component 214.

At operation 216 (indicated by "1"), the encryption service 202 may receive a first order to generate encryption material for a first set of IT devices from a first user 204(1) associated with a first vendor computing device 206(1).

At operation 218 (indicated by "2"), the queue component 210 generates data representing a queue. The queue component 210 of the encryption service 102 may generally represent a computing system or another combination of processing logic, circuitry, hardware, and/or other components configured to support the processes, tasks, operations, and/or functions described herein. In some examples, the queue component 210 may store or otherwise receive data or information (such as orders) from vendor computing devices 206. The queue component 210 may generate a queue capable of being displayed via a user interface of a computing device associated with the encryption service 202.

At operation 220 (indicated by "3"), the encryption service 202 receives a second order to generate encryption material for a second set of IoT devices from a second user 204(2) associated with a second vendor computing device 206(2).

At operation 222 (indicated by "4"), an order partition component 212 of the encryption service 202 partitions the first order to generate encryption material for a first set of IoT devices into a first number of portions and partitions the second order to generate encryption material for a second set of IoT devices into a second number of portions. In some examples, the order partition component 212 is associated with the encryption schedule component 214. The order partition component 212 may partition an order into any number of portions based on a variety of factors. Factors may include an order size, order priority, vendor priority, number of total orders, and the like. For example, an order requiring a larger set of IT encryption material may be partitioned into larger portions than an order requiring a smaller set of encryption material. For example, a first order to generate encryption material for a set of 1,000,000 IoT devices may be partitioned into 100 portions, where each portion represents encryption material to be generated for 10,000 IoT devices, while a second order to generate encryption material for a second set of 100,000 IoT devices may also be partitioned into 100 portions, but each portion would represent encryption material to be generated for 1,000 IoT devices. In some examples, the portion sizes may be the same for different sets of orders regardless of the number of IoT devices requiring encryption material.

At operation 224 (indicated by "5"), the encryption schedule component 214 of the encryption service 202 is configured to generate one or more dynamic encryption material schedule(s). A dynamic encryption material schedule may be configured to partition an order into a number of portions. A dynamic encryption material schedule may also be configured to cause the first number of portions of the first set of IoT devices to be interweaved with the second number of portions of the second set of IoT devices such that at least a portion of the second encryption material is generated for at least a portion of the second set of IoT devices prior to complete generation of the first encryption material for all of the first set of IoT devices. The encryption service 202 may apply the dynamic encryption material schedule such that the first encryption material and the second encryption material are generated at least partially in parallel.

Figure 3:
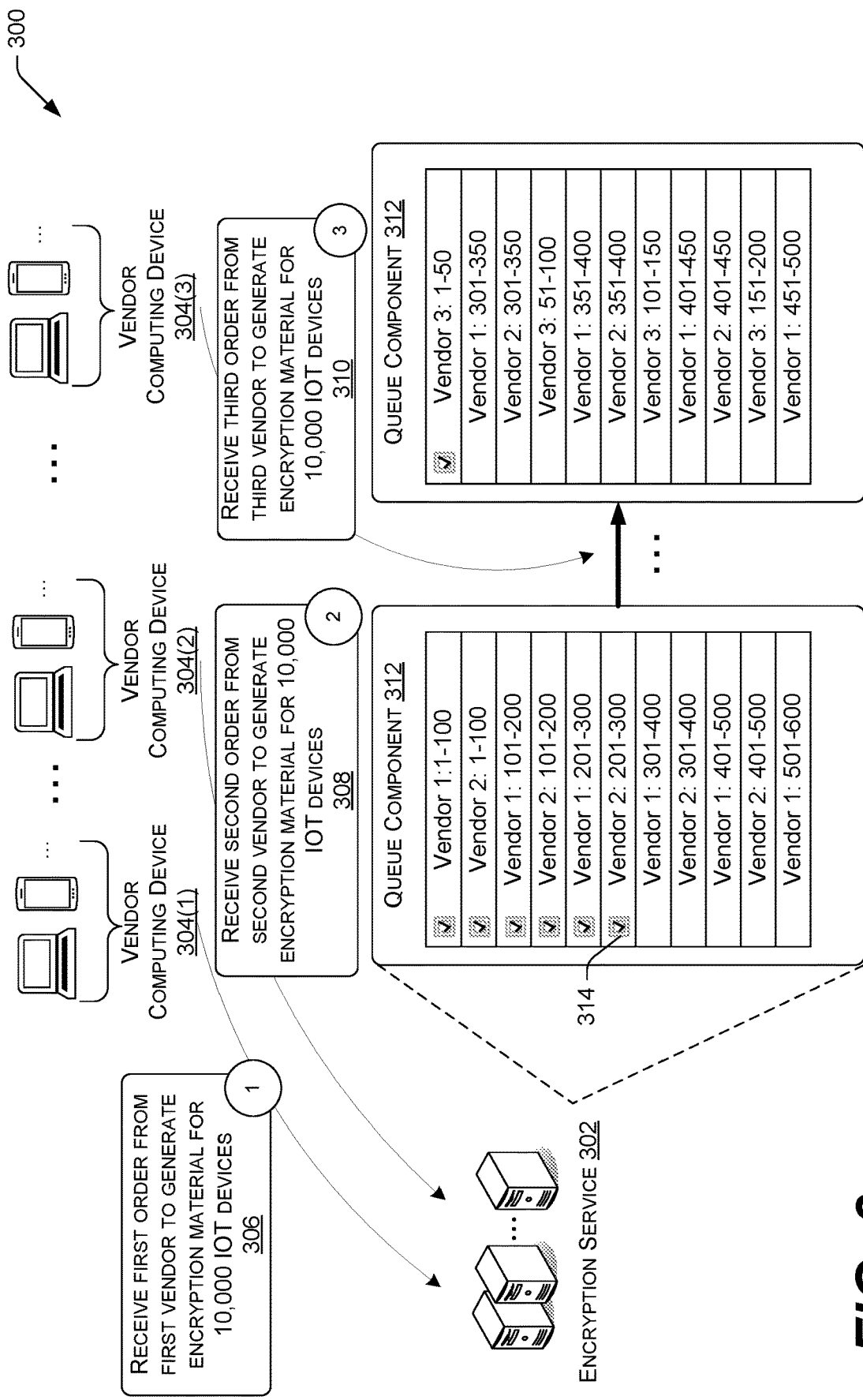
FIG. 3 is an example environment of how a queue as displayed on an encryption service device may be updated based on receiving an additional order from a vendor, according to an embodiment as described herein.

FIG. 3 is an example environment 300 of how a queue, as displayed on a computing device associated with the encryption service 302, may be dynamically updated based on receiving an additional order from a vendor, according to an embodiment as described herein. The values provided in FIG. 3 are merely provided as an example and any number of IoT devices may be used.

At operation 306 (indicated by "1"), the encryption service 302 receives a first order from a first vendor computing device to generate first encryption material for a first set of IoT devices (e.g., 10,000 IoT devices).

At operation 308 (indicated by "2"), the encryption service 302 receives a second order from a second vendor computing device 304(2) to generate second encryption material for a second set of IoT devices (e.g., 10,000 IoT devices). The queue component 312 may be associated with a user interface. The user interface may be displayed via a computing device associated with the encryption service 302. The user interface may be configured to provide a list of orders received from one or more vendor computing devices. In some examples, the user interface associated with the queue component 312 may present a list of orders that have been partitioned into a number of portions and interweaved in a manner that enables the encryption service 302 to generate encryption material for multiple orders at least partially in parallel. For example, queue component 312 presents a list of two orders (a first order from a first vendor and a second order from a second vendor) and each of the orders has been partitioned/divided into a number of portions. Each order may be partitioned based at least in part on a dynamic encryption material schedule. In the particular example, the first order received from the first vendor has been partitioned into 100 portions where each of the 100 portions requires generating encryption material for 100 IoT devices (i.e., vendor 1:1-100, vendor 1:101-200, vendor 1:201-300, etc.). In the particular example, the second order received from the second order has also been partitioned into 100 portions where each of the 100 separate portions requires generating encryption material for 100 IoT devices (i.e., vendor 2:1-100, vendor 2:101-200, vendor 2:201-300, etc.).

The first order and the second order may require encryption material for a different number of IoT devices. For example, a first order to generate encryption material for 100,000 IoT devices may be partitioned into 50 portions (e.g., vendor 1:1-2,000, vendor 1:2,001-4,000, vendor 1:4,001-6,000 etc.) while a second order to generate encryption material for 750,000 IoT devices may also be partitioned into 50 portions (e.g., vendor 2:1-15,000, vendor 2:15,001-30,000, vendor 2:30,001-45,000), where each portion in the second order would be greater than each portion in the second order.

In some examples, the dynamic encryption material schedule may partition an order into equal portions. For example, an order for 10,000 IoT devices can be partitioned into 100 equal portions where each portion contains 1,000 IoT devices requiring encryption material. In some examples, the dynamic encryption material schedule may divide an order into unequal portions. For example, the first portion of an order may be larger than subsequent portions. For example, an order for 10,000 IoT devices requiring encryption material may be divided into 11 portions where the first portion of the order is larger than subsequent portions (e.g., vendor 1:1-5,000, vendor 1:5,001-5,500, vendor 1:5,501-6,000, etc.).

In the example in FIG. 3, the dynamic encryption material schedule is configured to partition both the first order and the second order into an equal number of portions (i.e., 100 portions), however, it is to be understood that different orders may be divided/partitioned into any number of portions. For example, one or more orders may be partitioned into a different number of portions such that different orders will be completed at different rates. For example, a first order to generate encryption material for 10,000 IoT devices may be partitioned into 50 portions while a second order to generate encryption material for 10,000 IoT devices may be partitioned into 100 portions. In this particular example, the encryption service 302 would complete the first order before the second order.

In some examples, the dynamic encryption material schedule may partition an order into more or less portions based at least in part on the number of orders in the queue. For example, orders may be divided into smaller portions based at least in part on more orders being present in the queue.

In some examples, the dynamic encryption material schedule may be configured to partition an order based at least in part on a priority level associated with the order. In some examples, an order associated with a higher priority may be partitioned into fewer portions compared to an order associated with a lower priority. For example, an order associated with an earlier due date (i.e., a completion time) may have a higher priority than an order associated with a later due date. In at least one example, an order may be associated with a high priority based at least in part on the vendor being considered a high priority vendor. A vendor may be considered high priority based on the number of orders a vendor has placed in the past or on the number of encryption material the vendor has requested. For example, a vendor that has placed 100 separate orders for encryption material may be associated with a higher priority than a vendor that has placed only 10 separate orders. In some examples, a vendor that has ordered encryption material for 1,000,000 IoT devices is associated with a higher priority than a vendor that has ordered encryption material for only 500,000 IoT devices.

In some examples, the dynamic encryption material schedule may be configured to partition an order based at least in part on an identifier associated with a vendor. An identifier can indicate whether a vender is considered a high priority vendor, or any other information about the vendor that may change the generation and application of the dynamic encryption material schedule. A vendor priority level may be based at least in part on a number of orders a vendor has placed, the type of IoT devices associated with the vendor (e.g., medical type IoT devices may have a higher priority than entertainment type IoT devices), the number of IoT devices requiring encryption material, and the like.

In some examples, the dynamic encryption material schedule may be configured to partition an order that is of a certain size. For example, the dynamic encryption material schedule may be configured to only partition orders that require encryption material to be generated for more than 10,000 IoT devices (i.e., a threshold value) and orders below this threshold value will not be partitioned but processed in one batch. In some examples, the dynamic encryption material schedule may be configured to partition an order up to a maximum number of portions. For example, the dynamic encryption material schedule may be configured to partition an order to no more than 10 portions (i.e., a maximum number of portions) regardless of the size of the order. In some examples, a maximum number of portions may be associated with a vendor identifier (e.g., a high priority vendor may be associated with a lower maximum number of portions).

The encryption service 102, after receiving the second order from the second vendor, may then cause the first number of portions of the first set of IT devices to be interweaved with the second number of portions of the second set of IoT devices such that at least a portion of the second encryption material is generated for at least a portion of the second set of IoT devices prior to complete generation of the first encryption material for all of the first set of IoT devices. For example, the user interface associated with queue component 312 presents an example queue where the 100 portions of the first set of IoT devices are interweaved with the 100 portions of the second set of IoT devices (i.e., vendor 1:1-100, vendor 2:1-100, vendor 1:101-200, vendor 2:101-200, vendor 1:201-300, etc.). In some examples, the user interface associated with queue component 312 may present an indicator 314 indicating which portions have been processed or completed. In some examples, the indicator 314 may indicate which portion is currently being processed by the encryption service 302.

At operation 310 (indicated by "3"), the encryption service 302 receives a third order from a third vendor computing device 304(3) to generate encryption material for a third set of IoT devices (i.e., 10,000 IoT devices). The user interface associated with the queue component 312 may be configured to provide an updated list of orders based at least in part on receiving the third order. Additionally, in response to receiving the third order, the encryption service 302 may generate a new dynamic encryption material schedule configured to partition the third set of IoT devices into a third number of portions. In some examples, the dynamic encryption material schedule may be configured to partition an order based at least in part on a number of orders in the queue. For example, the dynamic encryption material schedule may be configured to partition orders into larger portions (i.e., fewer portions) based at least in part on only two orders being present in the queue. In some examples, the dynamic encryption material schedule may be configured to partition orders into a larger number of portions based at least in part on receiving an additional order. In some examples, the encryption material schedule may be configured to partition orders into a smaller number of portions based at least in part on receiving an additional order. In the particular example in FIG. 3, the dynamic encryption material schedule is configured to repartition the first and second orders into portions that require generation of encryption material for 50 IoT devices. The dynamic encryption material schedule may also be configured to interweave the first, second, and third orders in a manner that causes a portion of the third order (or third encryption material) to be generated prior to complete generation of the first encryption material and the second encryption material (i.e., vendor 3:1-50, vendor 1:301-350, vendor 2:301-350, vendor 3 51-100, vendor 1:351-400, etc.).

FIGS. 4-7 illustrate example processes for generating encryption material for different sets of IoT devices. Various methods are described with reference to the example systems of FIGS. 1-3 for convenience and ease of understanding. However, the methods described are not limited to being performed using the systems of FIGS. 1-3 and/or FIG. 8 and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the methods may be omitted entirely. Moreover, the methods described herein can be combined in whole or in part with one another, and/or with other methods.

Figure 4:
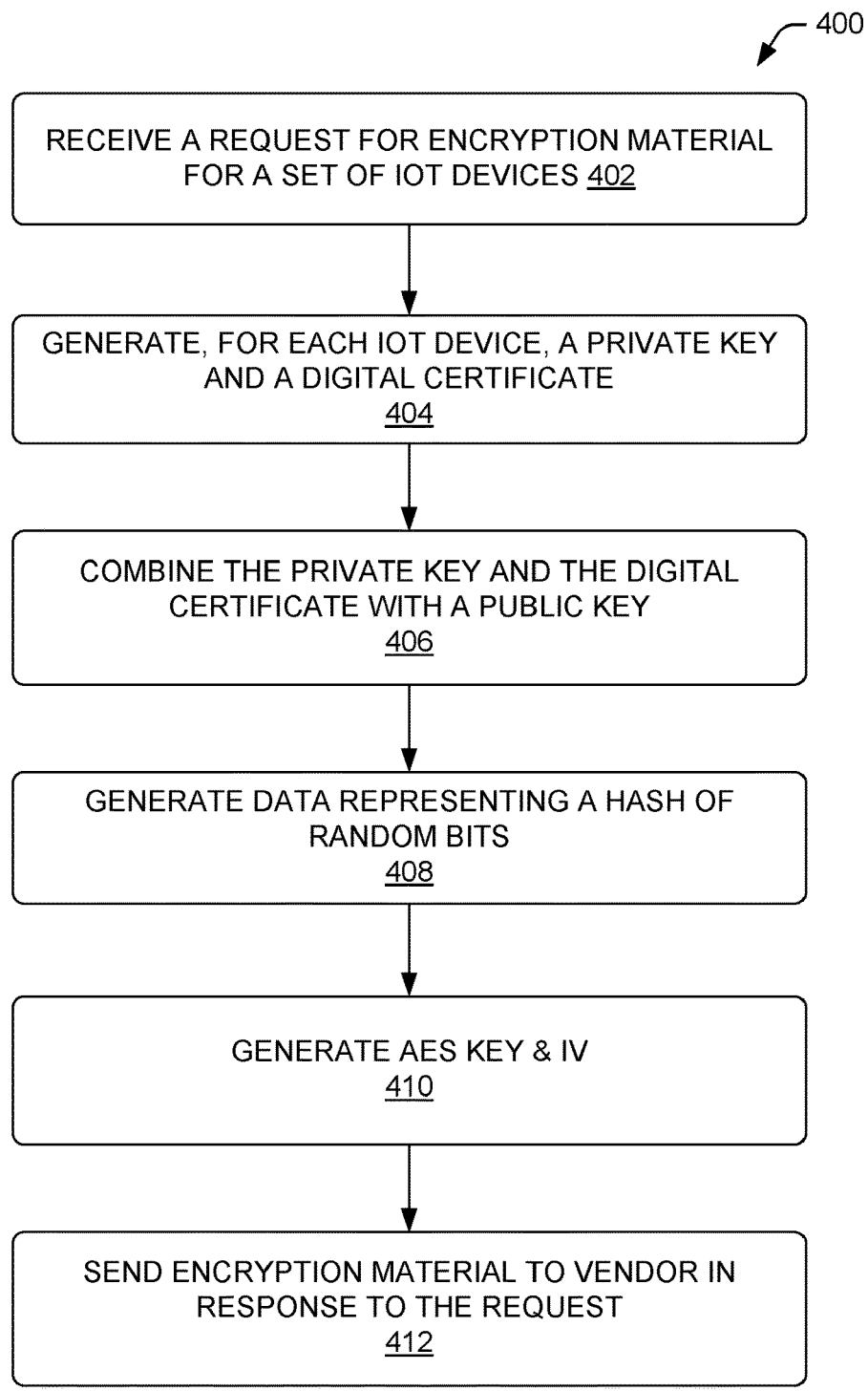
FIG. 4 is a flow diagram of an example method for generating encryption material for a set of IoT devices, according to an embodiment as described herein.

FIG. 4 illustrates a flowchart outlining an example method 400 for generating encryption material for a set of IoT devices, according to an embodiment as described herein.

At block 402, the encryption service may receive a request for encryption materials for a set of IoT devices. In some examples, the encryption service may receive the request from a computing device associated with a vendor. In some examples, the request may be received based at least in part on the vendor submitting an order to generate encryption material for a set of IoT devices produced and/or sold by the vendor. In some examples, the request for encryption material may include information specific to individual IoT devices in the set of IoT devices. For example, the information may include a list of serial numbers or identification numbers associated with each of the IoT devices. In some examples, the encryption service may receive a second request for encryption materials for a second set of IoT devices from the same vendor. The second set of IoT devices may be intended to exist and function in the same authorized ecosystem as the first set of IoT devices. For example, the first set of IoT devices may be programmed to communicate with and/or to collect analytical information from the second set of IoT devices. For example, and not by way of limitation, the first set of IoT devices may be hub IoT devices programmed to communicate with and collect analytical information from a second set of IoT devices, such as IoT light bulbs, IoT light switches, IoT thermostats, IoT cameras, IoT alarm systems, and the like. In some examples, IoT devices between different vendors may be programmed to communicate with each other in an authorized ecosystem. For example, a first vendor (Phillips Hue) may want to partner with the second vendor (Amazon) and enable the second vendor's IoT devices to be authenticated as part of an authorized ecosystem.

At block 404, the encryption service may generate, for each of the IoT devices, a private key and a digital certificate. In some examples, the private key may be a standards-based X.509 Elliptic Curve Cryptography (ECC) private key and enables a user (e.g., a vendor) to authenticate an IoT device. In some examples, the encryption service may generate a public key in addition to the private key (i.e., a key pair). The private key and digital certificate may be used to authenticate an IoT device as being part of an authorized ecosystem. For example, a digital certificate may be used to identify an IoT device before granting a user access to a resource associated with the IoT device. In some examples, the digital certificate may include an IoT device's unique identifying information, the IoT device's type and capabilities, the IoT device's relationship to other IoT device(s), installed location (e.g., location of the manufacturing facility that installed the encryption material into the IoT device), manufacture's certification and other information as appropriate. In some examples, a digital certificate may be automatically and continuously updated and maintained throughout the IoT device's life cycle.

At block 406, the encryption service may combine the private key and the digital certificate with a server-side ECC public key such that random bits are derived. For example, an IoT device's private key may be combined with a server-side ECC public key using an Elliptic Curve Diffie-Hellman (ECDH) key exchange function to derive 256 random bits. Different elliptic curves may provide a different level of security (i.e., cryptographic strength), a different level of performance (i.e., speed), different key length, and may also involve different algorithms. In some examples, the length of the ECC public key may depend on an underlying elliptic curve. For example, the ECC public key may be 192-bit (curve secp192r1), 233-bit (curve sect233k1), 224-bit (curve secp224k1), 256-bit (curves secp256k1 and Curve25519), 283-bit (curve sect283k1), 384-bit (curves p384 and secp384r1), 409-bit (curve sect409r1), 414-bit (curve Curve41417), 448-bit (curve Curve448-Goldilocks), 511-bit (curve M-511), 521-bit (curve P-521), 571-bit (curve sect571k1), and the like.

At block 408, the encryption service may generate first data representing a hash of random bits. For example, the key generation component may perform a SHA 256 hashing function. In some examples, the key generation component may perform a SHA-2, SHA-3 (and its variants SHA3-224, SHA3-256, SHA3-384, SHA3-512), SHA-512, SHA-384, RIPEMD-160, BLAKE2, BLAKE2s, or BLAKE2b hashing function to generate random bits. In some examples, any hash function that coverts a large, possibly variable-sized, amount of data into a small datum is capable of being used.

At block 410, the encryption service may generate two sets of the first data representing the hash, wherein the first set represents an advanced encryption standard (AES) key, and the second set represents an initialization vector (IV). For example, the key generation component may divide the 256 random bits into two sets of data representing an IoT device's symmetrical key material where the first set represents an IoT device's AES key and the second set represents the IoT device's IV. In some examples, bits 0-127 represent the IoT device's AES key and bits 128-256 represent the IoT device's IV. The AES key and IV are configured to encrypt private analytical information generated and stored by the IoT device while performing in an authorized ecosystem.

At block 412, the encryption service may send the encryption material including the two sets of the first data to a computing system associated with a vendor. In some examples, the encryption service may send the encryption material to a manufacturing facility authorized to receive the encryption material. In some examples, the encryption material including the two sets of the first data may be in a format configured to be utilized by the receiving computing system (e.g., a vendor, manufacturing facility, etc.) to store the encryption material in a storage of the set of IoT devices.

Additionally, or alternatively, the method 400 may include programing the IoT device to include the serial number, the private key, the digital certificate, the AES key, and the IV in a format configured to enable the cloud-based server to authenticate the IoT device as being a part of an authorized ecosystem associated with the IoT device and to enable encryption of collected data from the IoT device. The method 400 may also include receiving, via the cloud-based server, a first batch of serial numbers, each associated with IoT devices from a first vendor. The method 400 may also include receiving, via the cloud-based server, a second batch of serial numbers, each associated with IoT devices from a second vendor. The method 400 may also include generating, via the cloud-based server, key encryption material associated with the first batch of IoT devices from the first vendor and the second batch of IoT devices from the second vendor.

Additionally, or alternatively, the method 400 may include receiving, from a vendor, a request to decrypt the analytical information and the serial number. The method 400 may also include regenerating, based at least in part on the serial number, the AES key and the IV. The method 400 may also include sending, to the vendor, the AES key and the IV in a format configured to be utilized by the vendor to decrypt the analytical information.

Additionally, or alternatively, the method 400 may include receiving, via the cloud-based server, a second request for encryption materials for a second set of IoT devices configured to connect to and be identified by the first set of IoT devices. The method 400 may also include generating encryption material for the second set of IoT devices for the vendor. The method 400 may also include receiving, from the vendor, a request to decrypt analytical information associated with the IoT device and the serial number. The method 400 may also include extracting, based at least in part on the serial number, a public key associated with the IoT device. The method 400 may also include combining the public key with a server-side ECC private key to derive second random bits. The method 400 may also include generating second data representing an additional hash of the second random bits and generating key material containing a second AES key and a second IV. The method 400 may also include sending, to the computing system associated with the vendor, the key material in a format configured to enable the vendor to decrypt the analytical information.

Additionally, or alternatively, the method 400 may include determining that the request was received from the computing system of the vendor as part of an authorized ecosystem that includes the IoT device, wherein generating the private key and the digital certificate is performed based at least in part on the request being received from the authorized ecosystem.

Figure 5:
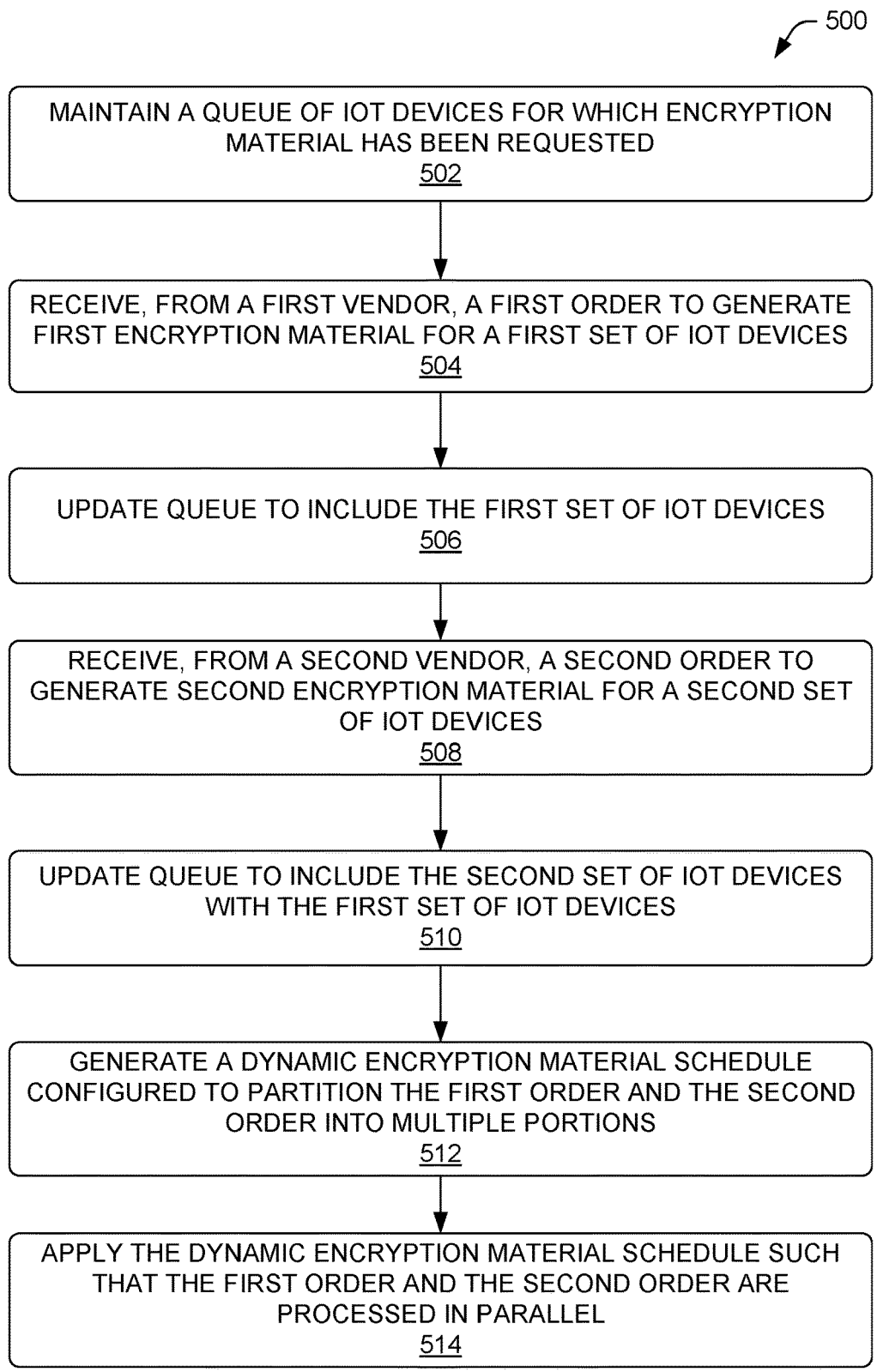
FIG. 5 is a flow diagram of an example method for generating and applying a dynamic encryption schedule, according to an embodiment as described herein.

FIG. 5 illustrates a flow diagram outlining an example method 500 for generating and applying a dynamic encryption schedule, according to an embodiment as described herein. In some examples, method 500 may be performed by a computing device comprising one or more processors and one or more non-transitory computer-readable media storing computer-executable instructions, that when executed by the one or more processors, cause the one or more processes to perform method 500.

At block 502, the encryption service may generate and maintain first data representing a queue of IoT devices for which encryption material generation has been requested. In some examples, the queue component may store or otherwise receive data or information (such as orders) from a vendor computing device. The queue component may generate a queue capable of being displayed via a user interface of a computing device associated with the encryption service.

At block 504, the encryption service may receive, from a first computing system associated with a first vendor, a first order to generate first encryption material for a first set of IoT devices. In some examples, the first set of IoT devices is associated with a first type of IoT devices.

At block 506, the encryption service may generate second data representing a first updated queue that includes the first set of IoT devices with previously pending IoT devices. The queue component may present, via a user interface, the first order received from the vendor computing devices.

At block 508, the encryption service may receive, from a second computing system associated with a second vendor, a second order to generate second encryption material for a second set of IoT devices. In some examples, the second set of IoT devices is associated with a second type of IoT devices different than the first type.

At block 510, the encryption service may generate third data representing a second updated queue that includes the second set of IoT devices and the previously pending IoT devices. For example, the queue component may present a second updated queue, via a user interface, including both the first order and the second order. In some examples, the queue component may present a second updated queue including portions of orders that have been interweaved in a manner that enables the encryption service to generate encryption material for multiple orders at least partially in parallel.

At block 512, the encryption service may generate fourth data representing a dynamic encryption material schedule configured to partition the first set of IoT devices into a first number of portions and to partition the second set of IoT devices into a second number of portions. For example, a first order associated with a first set of IoT devices received from a first vendor may be partitioned into 100 portions where each of the 100 individual portions requires generating encryption material for 100 IoT devices (i.e., vendor 1:1-100, vendor 1:101-200, vendor 1:201-300, etc.). Additionally, a second order received from a second vendor may be partitioned into 100 portions where each of the 100 individual portions requires generating encryption material for 100 IoT devices (i.e., vendor 2:1-100, vendor 2:101-200, vendor 2:201-300, etc.).

At block 514, the encryption service may apply the dynamic encryption material schedule such that the first number of portions of the first set of IoT devices is interweaved with the second number of portions of the second set of IoT devices and the first encryption material and the second encryption material are generated at least partially in parallel. For example, the queue component may present, via a user interface, an example queue where the 100 portions of the first set of IoT devices are interweaved with the 100 portions of the second set of IoT devices (i.e., vendor 1:1-100, vendor 2:1-100, vendor 1: 101-200, vendor 2:101-200, vendor 1:201-300, etc.). In some examples, the user interface associated with queue component may present an indicator indicating which portions have been processed or completed. In some examples, the indicator may indicate which portion is currently being processed by the encryption service.

Additionally, or alternatively, the method 500 may include receiving, from a third computing system associated with a third vendor, a third order to generate third encryption material for a third set of IoT devices. The method 500 may also include causing the third encryption material to be generated utilizing the dynamic encryption material schedule, wherein causing the third encryption material to be generated includes causing a portion of the third encryption material to be generated prior to complete generation of the first encryption material and prior to complete generation of the second encryption material.

Additionally, or alternatively, the method 500 may include determining, based at least in part on an identifier associated with the first vendor, that a first priority level associated with the first order is a higher priority level than a second priority level associated with the second order, wherein generating the fourth data representing the dynamic encryption material schedule is based at least in part on the first priority level being the higher priority level than the second priority level.

Additionally, or alternatively, the method 500 may include storing a trained machine learning model configured to determine dynamic encryption material schedules for generation of encryption material across multiple vendors. The method 500 may also include collecting vendor data and order data associated with the first vendor and the second vendor and applying the trained machine learning model to the vendor data and order data such that the dynamic encryption material schedule is generated and is specific to the first vendor and the second vendor.

Additionally, or alternatively, the method 500 may include determining a completion time associated with completing the first order and determining a completion time associated with completing the second order. The method 500 may also include determining that the completion time associated with the first order is earlier than the completion time of the second order, wherein generating the second data representing the dynamic encryption material schedule is based at least in part on the completion time associated with the first order being earlier than the completion time of the second order.

Additionally, or alternatively, the method 500 may include determining a number of orders in the queue, wherein generating the second data representing the dynamic encryption material schedule is based at least in part on the number of orders in the queue. The method 500 may also include configuring the dynamic encryption material schedule to partition the first set of IoT devices into the first number of portions based at least in part on a size of the first order and the second order.

Figure 6:
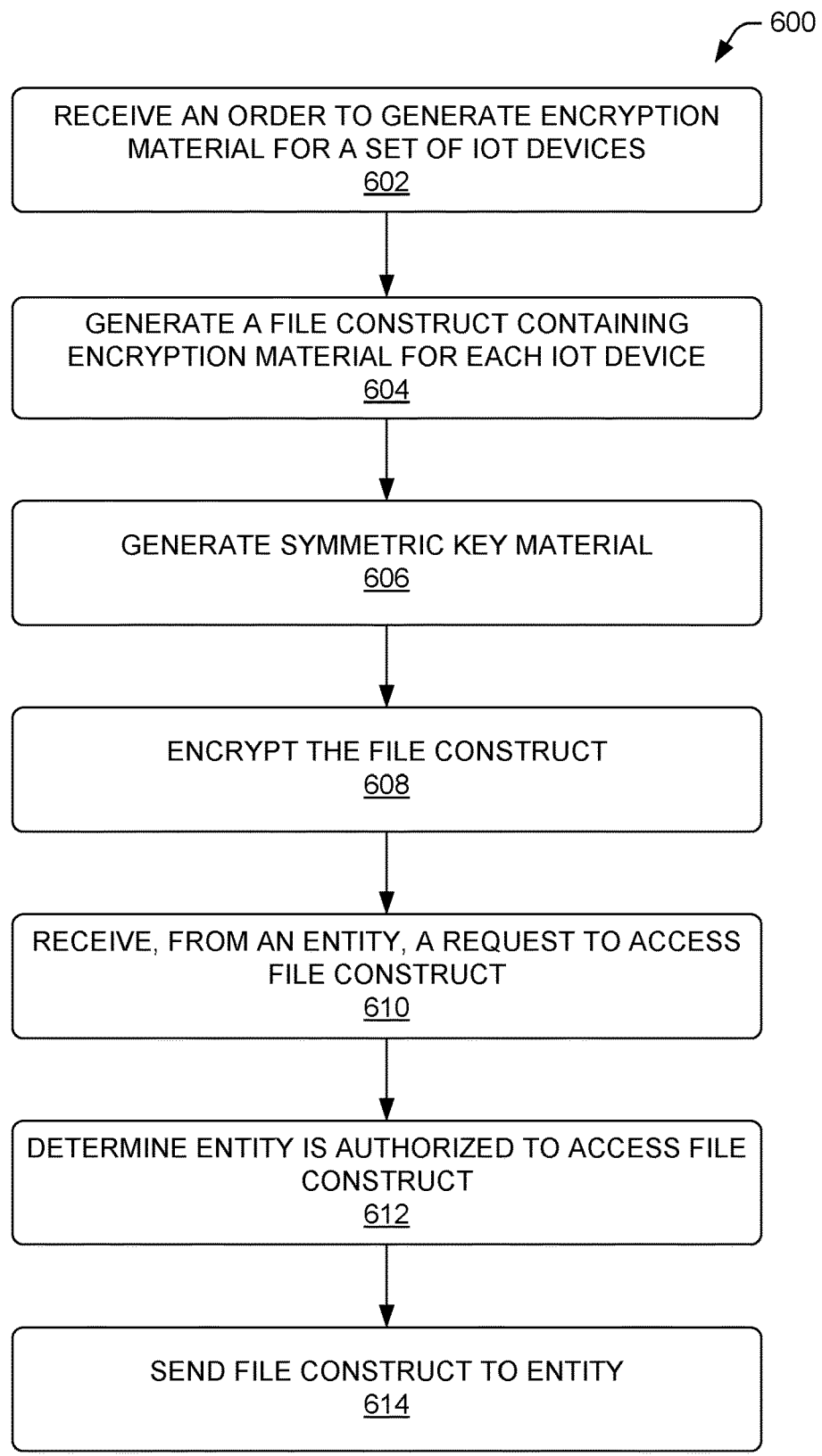
FIG. 6 is a flow diagram of an example method for generating a file construct for a set of IoT devices, according to an embodiment as described herein.

FIG. 6 illustrates a flow diagram outlining an example method 600 for generating a file construct for a set of IoT devices, according to an embodiment as described herein. In some examples, method 600 may be performed by a computing device comprising one or more processors and one or more non-transitory computer-readable media storing computer-executable instructions, that when executed by the one or more processors, cause the one or more processes to perform method 600. A file construct (or batch file) may be a file containing data associated with encryption material for a set of IoT devices and other related data.

At block 602, the encryption service may receive, from a computing device associated with a vendor, an order to generate encryption material for a set of IoT devices. In some examples, the computing device may be associated with a manufacturing facility.

At block 604, the encryption service may generate first data representing a file construct, the file construct containing second data representing encryption material for each of the IoT devices, the encryption material including (1) a private key, (2) digital certificate, (3) an advanced encryption standard (AES) key, and (4) an initialization vector (IV). In some examples, the second data may include additional information such as a manufacture identifier indicating which manufacturing facility (or location) is intended to receive the file construct. The file construct may also contain an identifier indicating which asymmetric key material was used to encrypt the file construct. A file construct may contain any number of encryption material for a set of IoT devices. For example, a first file construct may contain encryption material for a first set of 10,000 IoT devices and a second file construct may contain encryption material for a second set of 1,000 IoT devices.

At block 606, the encryption service may generate third data representing asymmetric key material, the asymmetric key material may include both a public key configured to encrypt the file construct and an private key configured to decrypt the file construct. In some examples, an asymmetric key pair may be generated using an RSA algorithm. Asymmetric encryption uses two distinct, yet related keys (i.e., a public key and a private key). A public key of the asymmetric key pair is used for encryption and the private key is intended to be secret so that only the authenticated recipient can decrypt the message. In some examples, the encryption service may utilize a hybrid encryption scheme by using an Elliptic Curve Diffie-Hellman (ECDH) key exchange scheme to derive a shared secret key for asymmetric data encryption and decryption. In at least one example, a symmetric key (as opposed to an asymmetric key) may be configured to encrypt a file construct, and the symmetric key may subsequently be encrypted using a public key, and both the encrypted file construct and the encrypted symmetric key may be sent to an authorized manufacturing facility.

At block 608, the encryption service may encrypt the file construct by utilizing the public key of the asymmetric key. Data encrypted with the public key may only be decrypted with a corresponding private key. In some examples, each file construct is encrypted with a unique asymmetric key pair. For example, a first file construct may be generated at a first time and encrypted by a first asymmetric key pair and a second file construct may be generated at a second time and encrypted by a second asymmetric key pair.

In some examples, the encryption service may generate a new asymmetric key pair (i.e., a new public key and private key pair) based at least in part on a period of time. For example, the encryption service may generate a new asymmetric key pair once every minute, once every hour, once a day, etc. In some examples, the encryption service may generate a new asymmetric key pair for each file construct, for each vendor, for each order, etc.

At block 610, the encryption service may receive, from a computing device associated with a manufacturing facility or a vendor, a request to access the file construct. For example, a computing device associated with a manufacturing facility can generate a request to access the file construct and can communicate the request to a computing device associated with the encryption service. In some examples, the request to access the file construct may be received by a server associated with the encryption service. In some examples, the encryption service may store a copy of the request in a data store.

At block 612, the encryption service may determine that the manufacturing facility is authorized to access the manufacturing facility. In some examples, verifying that the manufacturing facility is authorized may include referencing a public key of the requesting manufacturing facility computing device by a cloud authenticator. In some examples, the manufacturing facility may be determined to be an authorized facility based at least in part on the manufacture identifier associated with the file construct matching the requesting manufacturing facility. In some examples, determining whether a manufacturing facility is authorized to access the file construct is based at least in part on a number of requested key material matching the number of authorized encryption material. For example, if a manufacturing facility requests to access encryption material for a set of 20,000 IoT devices while the file construct only contains encryption material for 10,000 IoT devices, the manufacturing facility will be denied access to the file.

At block 614, the encryption service may send the file construct and a matching private key associated with the file construct to the computing device associated with the manufacturing facility. The private key enables the manufacturing facility to decrypt the specific file construct and access the encryption material for each of the IoT devices.

Additionally, or alternatively, the method 600 may include dividing the order to generate encryption material for multiple IoT devices such that each portion of an order is associated with a unique file construct. For example, the encryption service may receive, from a computing device associated with a vendor, an order to generate encryption material for a set of 10,000 IoT devices. The encryption service may partition the set of IoT devices into two portions, wherein the first portion contains a first sub-set of 5,000 IoT devices and the second portion contains a second sub-set of 5,000 IoT devices. The encryption service may then generate a first file construct for the first portion and a second file construct for the second portion. The encryption service may then generate a first asymmetric key pair and a second asymmetric key pair. The encryption service may then encrypt the first file construct by using at least a portion of the first asymmetric key pair and encrypt the second file construct by using at least a portion of the second asymmetric key pair.

Additionally, or alternatively, the method 600 may include generating, based at least in part on an expiration time associated with the first asymmetric key, fourth data representing a second asymmetric key. For example, the encryption service may generate a first asymmetric key pair and configure the first asymmetric pair to expire at the end of a set period of time (e.g., in an hour, in 24 hours, in one week, etc.). At the expiration of the set period of time, the encryption service may automatically generate a second asymmetric key to be associated with newly generated file constructs. This ensures that manufacturing facilities that were once authorized to access a file construct may no longer be able to decrypt subsequent file constructs. In some examples, the expiration time associated with the first asymmetric key pair may be based on a risk level associated with a manufacturing facility. In some examples, the risk level may be based at least in part on the manufacturing facility's location (e.g., a manufacturing facility located in California versus a manufacturing facility located in another country).

Additionally, or alternatively, the method 600 may include determining that the manufacturing facility is no longer authorized to access the first file construct. For example, a once authorized manufacturing facility that encrypts multiple IoT devices using the same encryption material may no longer be considered authorized to receive additional file constructs. The method 600 may also include generating fourth data representing a second file construct, generating fifth data representing second asymmetric key material, and encrypting the second file construct by utilizing the second asymmetric key material.

Additionally, or alternatively, the method 600 may include determining a risk level associated with the manufacturing facility and generating new data representing asymmetric key material configured to encrypt newly generated file constructs at a higher or lower frequency based at least in part on the risk level. In some examples, the risk level may be based at least in part on the manufacturing facility's location (e.g., a manufacturing facility located in California versus a manufacturing facility located in another country).

Additionally, or alternatively, the method 600 may include determining an IoT device type(s) indicated in an order to generate encryption material. For example, the encryption service may determine that the order to generate encryption material is for a set of medical type IoT devices (e.g., remote patient monitoring devices, glucose monitoring devices, heart monitoring devices, IoT-connected inhalers, etc.). The method 600 may also include determining that the manufacturing facility is authorized to access the file construct based at least in part on the IoT device type corresponding to an authorized IoT type indicator associated with the manufacturing facility. In some examples, the authorized IoT type indicator indicates what type or types of IoT devices that manufacturing facility is authorized to encrypt using the encryption material in the file construct.

Additionally, or alternatively, the method 600 may include determining that the manufacturing facility is no longer authorized to access the file construct and pausing generation of remaining key encryption material. For example, a manufacturing facility that is discovered (through fraud detection) to have encrypted multiple IoT devices using the same encryption material may no longer be authorized to access key encryption material generated by the encryption service.

Figure 7:
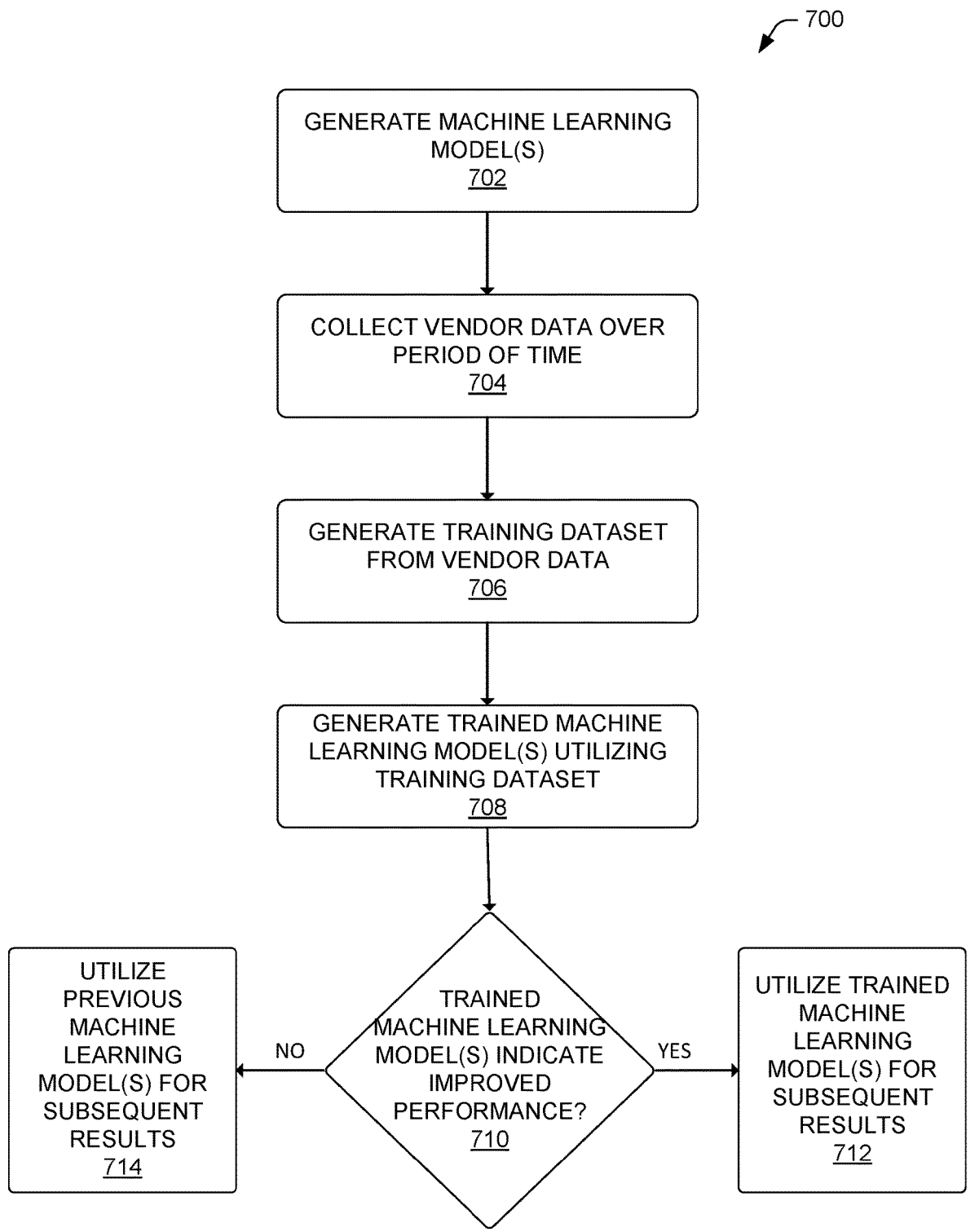
FIG. 7 is a flow diagram of an example process for utilizing machine learning in association with operations performed by an encryption service and one or more devices, according to an embodiment as described herein.

FIG. 7 is a flow diagram outlining an example process 700 for the generation and training of machine learning models to perform one or more of the processes described herein, according to an embodiment described herein. The order in which the operations or steps are described is not intended to be construed as a limitation, and any number of the described operations may be combined in any order and/or in parallel to implement process 700.

At block 702, the process 700 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 704, the process 700 may include collecting vendor data, order data, and data associated with dynamic encryption material schedules over a period of time. The vendor data and order data may include any of the data described with respect to the datastore(s), any data associated with the dynamic encryption material schedule as described herein, any data described with respect to FIGS. 1-3, or any other data that may be utilized to perform the operations described herein. This information may include, for example, the number of orders a vendor has placed, order size data, risk data associated with manufacturing facilities, IoT device data, encryption material data, order partition data, order repartition data, data relating to generation of dynamic encryption material schedules, etc.

At block 706, the process 700 may include generating a training dataset from the dynamic encryption material schedules data. Generation of the training dataset may include formatting the dynamic encryption material schedules data into input vectors for the machine learning model to intake, as well as associating the various data with the outcomes of the dynamic encryption material schedules described herein.

At block 708, the process 700 may include generating one or more trained machine learning models utilizing the training dataset. Generation of the trained machine learning models may include updating parameters and/or weightings and/or thresholds utilized by the models to generate new dynamic encryption material schedules based at least in part on the data from the training dataset.

For example, a machine learning model may be generated and configured to determine a most efficient dynamic encryption material schedule based on a number of orders in a queue and number of IoT devices requiring encryption material as described herein. To train the model, a training dataset indicating characteristics of prior orders received from vendors, feedback data indicating how orders were partitioned after additional orders were received, as well as data relating to how efficiently prior dynamic encryption material schedules performed (e.g., how long it took to process multiple orders in a queue). This data may serve to adjust weights and threshold that the model utilizes for these and other data types to determine how certain data is determined, scaled, or impacts other data. The output of these trained machine learning models may be a more accurate and may more readily identify risky transactions that should not proceed in an offline device user case.

At block 710, the process 700 may include determining whether the trained machine learning models indicate improved performance metrics. For example, a testing group may be generated where the outcomes of the transactions are known but not to the trained machine learning models. The trained machine learning models may generate results, which may be compared to the known results to determine whether the results of the trained machine learning model produce a superior result than the results of the machine learning model prior to training.

In examples where the trained machine learning models indicate improved performance metrics, the process 700 may include, at block 712, utilizing the trained machine learning models for generating subsequent results. For example, the trained machine learning models may be utilized to generate dynamic encryption material schedules that are configured to efficiently process multiple orders in a queue as described herein. It should be understood that the trained machine learning models may be utilized in any scenario where models are utilized as described herein.

In examples where the trained machine learning models do not indicate improved performance metrics, the process 700 may include, at block 714, utilizing the previous iteration of the machine learning models for generating subsequent results.

Example System and Device

Figure 8:
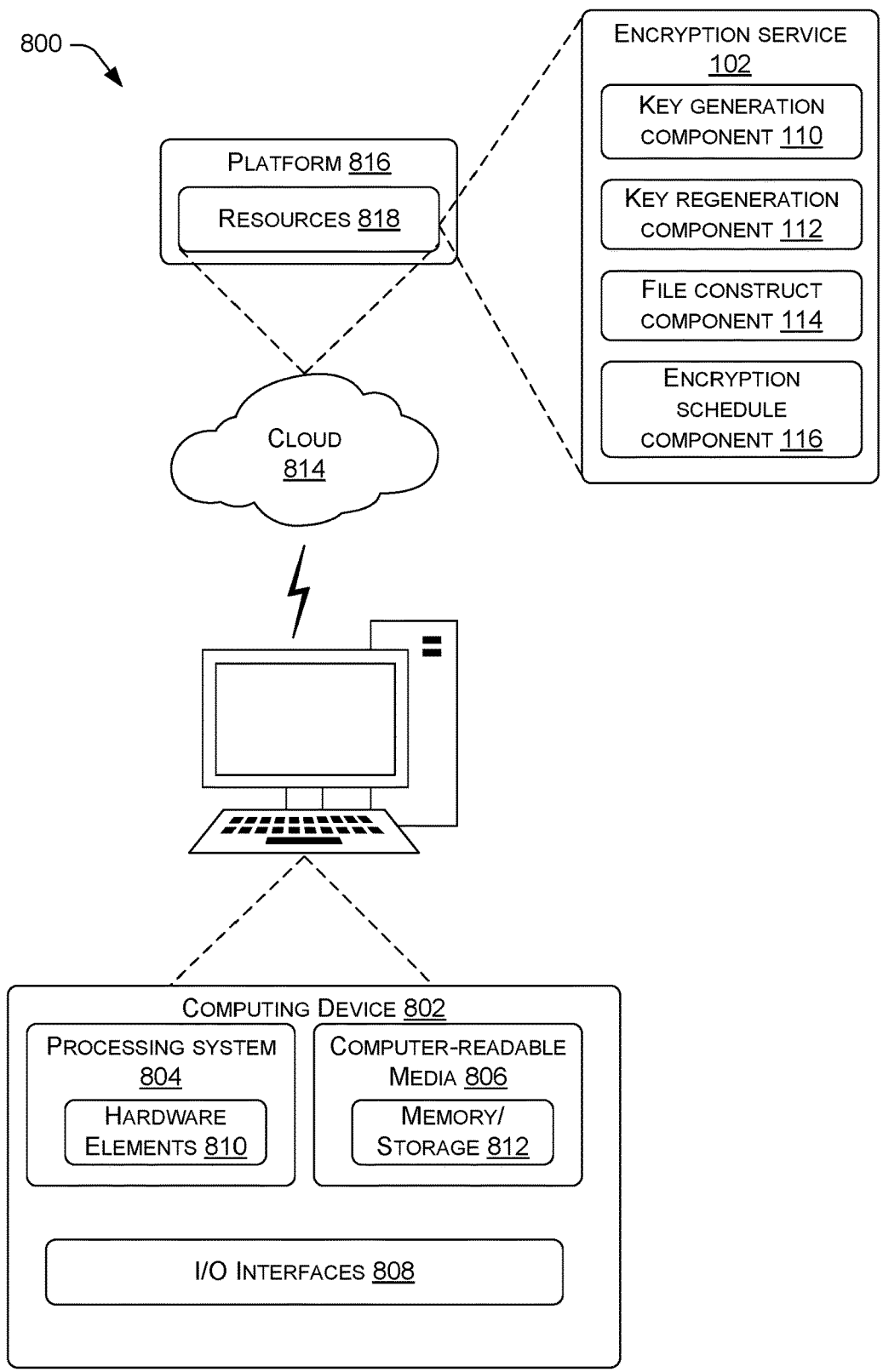
FIG. 8 is an example system and device that is usable to implement the techniques described herein.

FIG. 8 illustrates an example system 800 that includes an example computing device 802 that is representative of one or more computing systems and/or devices that may implement the various techniques described herein. This is illustrated through inclusion of the encryption service 102, the key generation component 110, the key regeneration component 112, the file construct component, and the encryption schedule component 116. The computing device 802 may be, for example, a server of a service provider, a device associated with a vendor (e.g., a vendor device), a device associated with a manufacturing facility (e.g., a manufacturing facility device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including a memory/storage component 812. The memory/storage component 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 802. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 802, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 810 and computer-readable media 806 are representative of modules, programmable device logic and/or device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also be scalable to provide a corresponding level of scale to encountered demand for the resources 818 that are implemented via the platform 816. Accordingly, in an interconnected device example, implementation of functionality described herein may be distributed throughout multiple devices of the system 800. For example, the functionality may be implemented in part on the computing device 802 as well as via the platform 816 which may represent a cloud computing environment, such as the cloud 814.

CONCLUSION

Although the discussion above sets forth example implementations of the described techniques, other architectures may be used to implement the described functionality, and are intended to be within the scope of this disclosure.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors; and
   one or more non-transitory computer-readable media storing instructions, that when executed by the one or more processors, cause the system to perform operations comprising:
   maintaining first data representing a queue of internet of things (IoT) devices for which encryption material generation has been requested;
   receiving, from a first computing system associated with a first vendor, a first order to generate first encryption material for a first set of IoT devices;
   generating second data representing a first updated queue that includes the first set of IoT devices with previously-pending IoT devices;
   receiving, from a second computing system associated with a second vendor, a second order to generate second encryption material for a second set of IoT devices;
   generating third data representing a second updated queue that includes the second set of IoT devices with the first set of IoT devices and the previously-pending IoT devices;
   generating fourth data representing a dynamic encryption material schedule configured to:
      partition the first set of IoT devices into a first number of portions;
      partition the second set of IoT devices into a second number of portions; and
      cause the first number of portions of the first set of IT devices to be interweaved with the second number of portions of the second set of IoT devices such that at least a portion of the second encryption material is generated for at least a portion of the second set of IoT devices prior to complete generation of the first encryption material for all of the first set of IoT devices; and
   applying the dynamic encryption material schedule such that the first encryption material and the second encryption material are generated at least partially in parallel.

2. The system of claim 1, the operations further comprising:
   receiving, from a third computing system associated with a third vendor, a third order to generate third encryption material for a third set of IoT devices; and
   causing the third encryption material to be generated utilizing the dynamic encryption material schedule, wherein causing the third encryption material to be generated includes causing a portion of the third encryption material to be generated prior to complete generation of the first encryption material and prior to complete generation of the second encryption material.

3. The system of claim 1, the operations further comprising:
   receiving, from a third computing system associated with a third vendor, a third order to generate third encryption material for a third set of IoT devices;
   generating fifth data representing a third updated queue that includes the third set of IoT devices with the previously-pending IoT devices;
   generating sixth data representing the dynamic encryption material schedule configured to:
      partition the third set of IoT devices into a third number of portions; and
      cause the third number of portions of the third set of IoT devices to be interweaved with the first number of portions of the first set of IoT devices and the second number of portions of the second set of IoT devices such that at least a portion of the third encryption material is generated for at least a portion of the third set of IoT devices prior to complete generation of the first encryption material for all of the first set of IoT devices and the second encryption material for all of the second set of IoT devices; and
   applying the dynamic encryption material schedule such that the first encryption material, the second encryption material, and the third encryption material are generated at least partially in parallel.

4. The system of claim 1, the operations further comprising:
   determining, based at least in part on an identifier associated with the first vendor, that a first priority level associated with the first order is a higher priority level than a second priority level associated with the second order; and
   wherein generating the fourth data representing the dynamic encryption material schedule is based at least in part on the first priority level being the higher priority level than the second priority level.

5. A method comprising:
   generating first data representing a first queue that includes:
      a first set of internet of things (IoT) devices associated with a first order to generate first encryption material as received from a first computing system associated with a first vendor; and
      a second set of IoT devices associated with a second order to generate second encryption material as received from a second computing system associated with a second vendor;
   generating second data representing a dynamic encryption material schedule configured to:
      partition the first set of IoT devices into a first number of portions;
      partition the second set of IoT devices into a second number of portions; and
      cause the first number of portions of the first set of IoT devices to be processed with the second number of portions of the second set of IoT devices such that at least a portion of the second encryption material is generated for at least a portion of the second set of IoT devices prior to complete generation of the first encryption material for all of the first set of IoT devices; and
   applying the dynamic encryption material schedule such that the first encryption material and the second encryption material are generated.

6. The method of claim 5, further comprising:
   receiving, from a third computing system associated with a third vendor, a third order to generate third encryption material for a third set of IoT devices; and
   causing the third encryption material to be generated utilizing the dynamic encryption material schedule, wherein causing the third encryption material to be generated includes causing a portion of the third encryption material to be generated prior to complete generation of the first encryption material and prior to complete generation of the second encryption material.

7. The method of claim 5, further comprising:
wherein the first data representing the first queue also includes a third set of IoT devices associated with a third order to generate third encryption material is received from a third computing system associated with a third vendor and generating the second data representing the dynamic encryption material schedule is further configured to:
partition the third set of IoT devices into a third number of portions; and
cause the third number of portions of the third set of IoT devices to be processed with the first number of portions of the first set of IoT devices and the second number of portions of the second set of IoT devices such that at least a portion of the third encryption material is generated for at least a portion of the third set of IoT devices prior to complete generation of the first encryption material for all of the first set of IoT devices and the second encryption material for all of the second set of IoT devices; and
applying the dynamic encryption material schedule such that the first encryption material, the second encryption material, and the third encryption material are generated.

8. The method of claim 5, further comprising:
determining, based at least in part on an identifier associated with the first vendor, that a first priority level associated with the first order is a higher priority level than a second priority level associated with the second order; and
wherein generating the second data representing the dynamic encryption material schedule is based at least in part on the first priority level being the higher priority level than the second priority level.

9. The method of claim 5, wherein the first data representing the first queue further includes a third set of IoT devices associated with a third order to generate third encryption material as received from a third computing system associated with a third vendor, the method further comprising:
generating the second data representing the dynamic encryption material schedule based at least in part on receiving the third order to generate third encryption material.

10. The method of claim 5, further comprising:
storing a trained machine learning model configured to determine dynamic encryption material schedules for generation of encryption material across multiple vendors;
collecting vendor data and order data associated with the first vendor and the second vendor; and
applying the trained machine learning model to the vendor data and order data such that the dynamic encryption material schedule is generated and is specific to the first vendor and the second vendor.

11. The method of claim 5, further comprising:
determining a completion time associated with completing the first order;
determining a completion time associated with completing the second order; and
determining that the completion time associated with the first order is earlier than the completion time of the second order; and wherein generating the second data representing the dynamic encryption material schedule is based at least in part on the completion time associated with the first order being earlier than the completion time of the second order.

12. The method of claim 5, further comprising:
determining a number of orders in the queue;
wherein generating the second data representing the dynamic encryption material schedule is based at least in part on the number of orders in the queue.

13. A system comprising:
one or more processors; and
one or more non-transitory computer-readable media storing instructions, that when executed by the one or more processors, cause the system to perform operations comprising:
generating first data representing a first queue that includes:
a first set of internet of things (IoT) devices associated with a first order to generate first encryption material as received from a first computing system associated with a first vendor; and
a second set of IoT devices associated with a second order to generate second encryption material as received from a second computing system associated with a second vendor;
generating second data representing a dynamic encryption material schedule configured to:
partition the first set of IoT devices into a first number of portions;
partition the second set of IoT devices into a second number of portions; and
cause the first number of portions of the first set of IoT devices to be processed with the second number of portions of the second set of IoT devices such that at least a portion of the second encryption material is generated for at least a portion of the second set of IoT devices prior to complete generation of the first encryption material for all of the first set of IoT devices; and
applying the dynamic encryption material schedule such that the first encryption material and the second encryption material are generated.

14. The system of claim 13, the operations further comprising:
receiving, from a third computing system associated with a third vendor, a third order to generate third encryption material for a third set of IoT devices; and
causing the third encryption material to be generated utilizing the dynamic encryption material schedule, wherein causing the third encryption material to be generated includes causing a portion of the third encryption material to be generated prior to complete generation of the first encryption material and prior to complete generation of the second encryption material.

15. The system of claim 13, wherein a first portion of the first number of portions is larger than the subsequent first number of portions based at least in part on the dynamic encryption material schedule.

16. The system of claim 13, wherein the dynamic encryption material schedule is configured to partition the first set of IoT devices into the first number of portions based at least in part on a size of the first order and the second order.

17. The system of claim 13, wherein the first data representing the first queue further includes a third set of IoT devices associated with a third order to generate third encryption material as received from a third computing system associated with a third vendor, the operations further comprising:

generating the second data representing the dynamic encryption material schedule based at least in part on receiving the third order to generate third encryption material.

18. The system of claim 13, the operations further comprising:

storing a trained machine learning model configured to determine dynamic encryption material schedules for generation of encryption material across multiple vendors;
  collecting vendor data associated with the first vendor and the second vendor;
  applying the trained machine learning model to the vendor data such that the dynamic encryption material schedule is generated and is specific to the first vendor and the second vendor.

19. The system of claim 13, the operations further comprising:

determining a completion time associated with completing the first order;
  determining a completion time associated with completing the second order; and
  determining that the completion time associated with the first order is earlier than the completion time of the second order; and
  wherein generating the second data representing the dynamic encryption material schedule is based at least in part on the completion time associated with the first order being earlier than the completion time of the second order.

20. The system of claim 13, the operations further comprising:

determining a number of orders in the queue;
  wherein generating the second data representing the dynamic encryption material schedule is based at least in part on the number of orders in the queue.

* * * * *